(12) United States Patent
Lekutai (10) Patent No.: US 11,751,117 B2
(45) Date of Patent: *Sep. 5, 2023

(54) SWITCHING WIRELESS NETWORK SITES BASED ON VEHICLE VELOCITY (71) Applicant: T-Mobile USA, Inc., Bellevue, WA (US)

(72) Inventor: Gaviphat Lekutai, Kirkland, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/169,197

(22) Filed: Feb. 14, 2023

(65) Prior Publication Data

US 2023/0199601 A1 Jun. 22, 2023

Related U.S. Application Data (63) Continuation of application No. 17/382,256, filed on Jul. 21, 2021, now Pat. No. 11,617,119, which is a continuation of application No. 16/813,648, filed on Mar. 9, 2020, now Pat. No. 11,089,529.

(51) Int. Cl.
H04W 4/00 (2018.01)
H04W 36/30 (2009.01)
H04W 36/32 (2009.01)
H04W 36/00 (2009.01)

(52) U.S. Cl.
CPC ....... *H04W 36/30* (2013.01); *H04W 36/0085* (2018.08); *H04W 36/00837* (2018.08); *H04W 36/32* (2013.01)

(58) Field of Classification Search
CPC .......... H04W 36/30; H04W 36/00837; H04W 36/0085; H04W 36/32; H04W 36/14
USPC ........................................................ 370/331
See application file for complete search history.

(56) References Cited

U.S. PATENT DOCUMENTS

| 5,455,962 | A | 10/1995 | Kotzin |
| 5,490,204 | A | 2/1996 | Gulledge |
| 5,594,946 | A | 1/1997 | Menich et al. |
| 5,623,484 | A | 4/1997 | Muszynski |
| 5,710,791 | A | 1/1998 | Royer et al. |
| 5,886,988 | A | 3/1999 | Yun et al. |
| 6,070,074 | A | 5/2000 | Perahia et al. |
| 6,081,732 | A | 6/2000 | Suvanen et al. |
| 6,229,481 | B1 | 5/2001 | Katz |

(Continued)

*Primary Examiner* — Amancio Gonzalez
(74) *Attorney, Agent, or Firm* — Perkins Coie LLP (57) ABSTRACT The disclosed technology proposes a new methodology to include the effect of speed and direction of a UE into the threshold used for determining when to switch between a 4G UL connection and a 5G UL connection. The system can use a lookup table with various speeds mapping to varying thresholds. The system can use an accelerometer sensor or digital compass to determine the direction of the vehicle, such as heading away from or toward the 5G site, so the vehicle can switch sooner from 5G-NR to LTE and from LTE to NR, respectively. For C-V2X applications, latency is an important factor because 5G technology provides shorter latency than 4G; thus keeping the link on 5G is preferred when under good coverage. Further, the idea is not limited to UL, 5G and/or vehicle technologies, but can also be applied to DL direction, Wi-Fi and/or drone technologies as well.

20 Claims, 7 Drawing Sheets (56) References Cited

U.S. PATENT DOCUMENTS

| | | |
|---|---|---|
| 6,272,354 B1 | 8/2001 | Saario |
| 6,377,812 B1 | 4/2002 | Rashid-farrokhi et al. |
| 6,385,183 B1 | 5/2002 | Takeo |
| 6,415,029 B1 | 7/2002 | Piket et al. |
| 6,433,737 B2 | 8/2002 | Katz |
| 6,438,377 B1 | 8/2002 | Savolainen |
| 6,438,378 B1 | 8/2002 | Kouno |
| 6,456,598 B1 | 9/2002 | Le et al. |
| 6,507,740 B2 * | 1/2003 | Shi .................. H04W 36/30 |
| | | 455/67.11 |
| 6,549,759 B2 | 4/2003 | Arviv et al. |
| 6,577,875 B1 | 6/2003 | Brouwer |
| 10,034,183 B2 * | 7/2018 | Buer .................. H04W 24/02 |
| 10,560,204 B1 * | 2/2020 | Patel .................. H04W 48/12 |
| 10,693,713 B1 * | 6/2020 | Yang .................. H04W 24/02 |
| 10,694,579 B2 * | 6/2020 | Tsuda .................. H04W 68/02 |
| 11,089,529 B1 | 8/2021 | Lekutai |
| 2002/0058481 A1 | 5/2002 | Mohebbi |
| 2002/0058511 A1 | 5/2002 | Mohebbi |
| 2002/0061750 A1 | 5/2002 | Mohebbi |
| 2002/0080719 A1 | 6/2002 | Parkvall et al. |
| 2002/0102977 A1 | 8/2002 | Shi |
| 2003/0224733 A1 | 12/2003 | Schwarz et al. |
| 2004/0022217 A1 | 2/2004 | Korpela et al. |
| 2004/0047312 A1 | 3/2004 | Muszynski et al. |
| 2004/0092262 A1 | 5/2004 | Voyer et al. |
| 2005/0243762 A1 | 11/2005 | Terry et al. |
| 2005/0250512 A1 | 11/2005 | Zhang et al. |
| 2005/0282574 A1 | 12/2005 | Li et al. |
| 2017/0176192 A1 | 6/2017 | Cardoso De Moura |
| 2019/0230587 A1 * | 7/2019 | Gilson .................. H04W 36/30 |
| 2021/0282126 A1 * | 9/2021 | Lekutai .................. H04W 72/51 |
| 2022/0116845 A1 * | 4/2022 | Logan .................. H04W 76/34 |

\* cited by examiner

SWITCHING WIRELESS NETWORK SITES BASED ON VEHICLE VELOCITY

CROSS REFERENCE TO RELATED APPLICATIONS

This application is a continuation of U.S. patent application Ser. No. 17/382,256, filed Jul. 21, 2021 entitled SWITCHING WIRELESS NETWORK SITES BASED ON VEHICLE VELOCITY, which is a continuation of U.S. patent application Ser. No. 16/813,648, filed Mar. 9, 2020, entitled SWITCHING WIRELESS NETWORK SITES BASED ON VEHICLE VELOCITY, both of which are hereby incorporated by reference in their entirety.

BACKGROUND 5G is the fifth-generation wireless technology for digital cellular networks, where covered areas are divided into cells with one or more antennas. The frequency spectrum of 5G is divided into millimeter waves, mid-band and low-band. 5G millimeter wave is the fastest, with speeds often being 1-2 Gbit/s on the downlink, and frequencies ranging from 24 GHz to 72 GHz. Millimeter waves have difficulty traversing many walls and windows, so indoor coverage is limited, and their reach is short, thus requiring many more cells (known as "small cells"). To make up for the gaps in 5G coverage, the cellular connection can be transferred to a 4G site. When the switch occurs, the quality of service (QoS) can degrade because of different connection speeds. Further, when a user equipment (UE) moves at a high speed, such as a speed of a vehicle, and the decision whether to switch between the 5G site and the 4G site occurs at a predetermined period suitable for low-speed motion, such as a speed of a pedestrian, it is possible that the switch between the 5G site and the 4G site cannot be made in time, and the connection between the UE and the 5G site can be dropped.

DETAILED DESCRIPTION

For non-stand alone (NSA) 5G architecture, there is an option to stay on 5G New Radio (NR) technology or 4G Long-Term Evolution (LTE) technology on the uplink (UL) direction. In early implementations, the UL cannot go on both 5G and 4G legs simultaneously (which is a feature called "UL PDCP aggregation"). Based on the Time Division Duplex (TDD) ratio structure of 5G, UL is dedicated 10-20% of available resources, while downlink (DL) receives 80-90% of the available resources.

When the switch occurs, the QoS can be choppy because of different connection speeds. Also, 5G UL coverage is very short and depends on the surroundings such as buildings, foliage, etc. For cellular vehicle-to-everything (C-V2X), the situation is worse because the speed of the vehicle can vary and the variation can be abrupt. Consequently, the QoS can be uneven, and can lead to lost data and calls.

The disclosed technology proposes a new methodology to include the effect of speed and direction of a UE into the threshold used for determining when to switch between a 4G UL connection and a 5G UL connection. For example, the disclosed system can use a lookup table with various speeds mapping to varying thresholds. Alternatively, or additionally, the system can use an accelerometer sensor or digital compass to determine the direction of the vehicle, such as heading away from or toward the 5G site, so the vehicle can switch sooner from 5G-NR to LTE and from LTE to NR, respectively. For C-V2X applications, latency is an important factor because 5G technology provides shorter latency than 4G, thus keeping the link on 5G is preferred when under good coverage. Further, the idea is not limited to UL, 5G and/or vehicle technologies, but can also be applied to DL direction, Wi-Fi and/or drone technologies as well.

Figure 1:
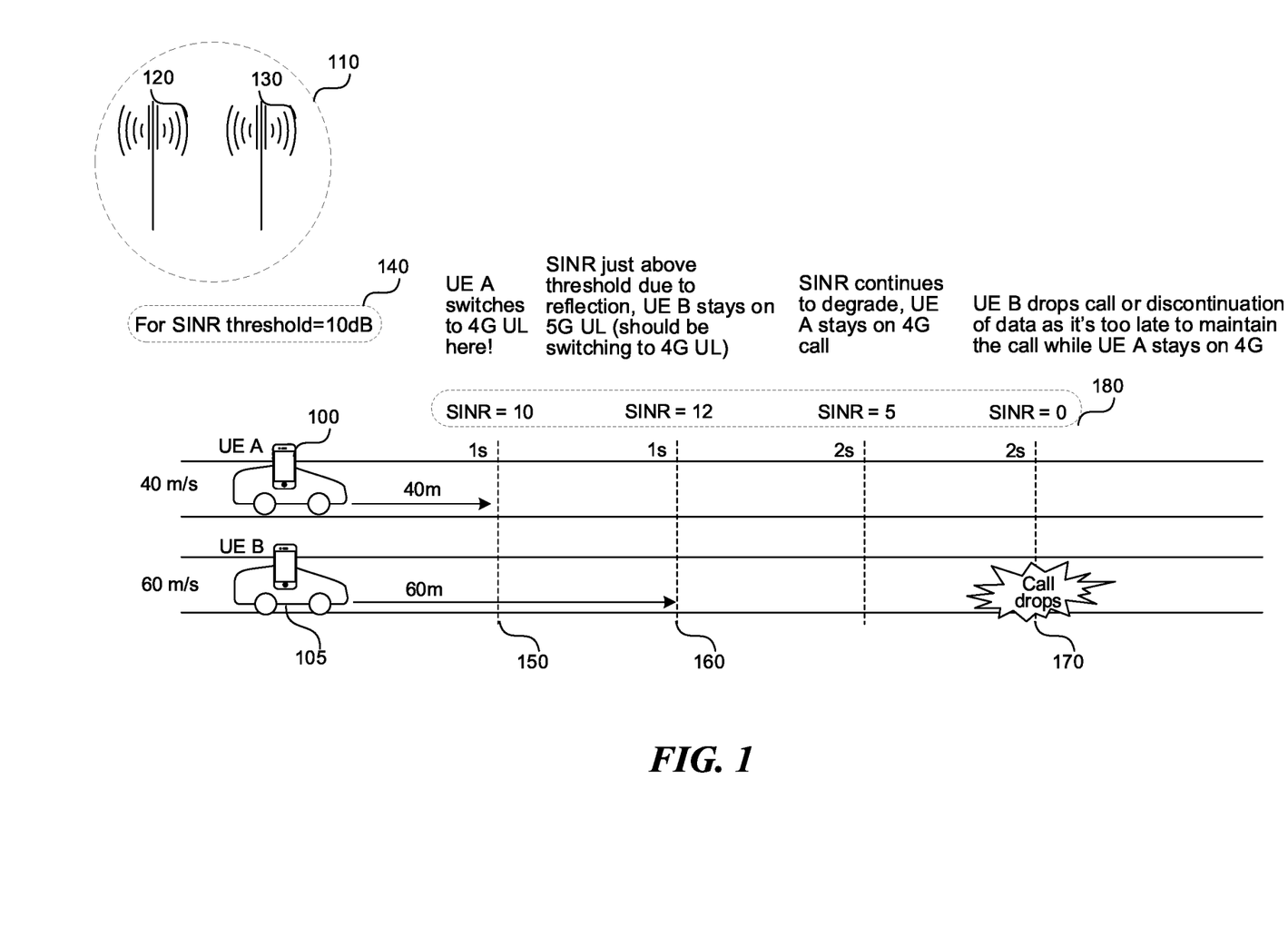
FIG. 1 shows multiple vehicles traversing various signal quality boundaries.

FIG. 1 shows multiple vehicles traversing various signal quality boundaries. Signal quality can be measured using various metrics such as signal to interference plus noise ratio (SINR), reference signal received power (RSRP), bit error rate, or packet error rate. Each signal quality metric can have a corresponding threshold. When the signal quality data at a particular location, measured using a particular signal quality metric, crosses the corresponding threshold, the connection between a UE 100, 105, such as a cellular vehicle, or a vehicle carrying a cellular transceiver, and a wireless network 110, can switch from a first wireless network site 120 to a second wireless network site 130.

The first wireless network site 120 can be a 5G site and/or a wireless network access point. The second wireless network site 130 can be a 4G site and/or a wireless network access point. The first wireless network site 120 can provide higher bandwidth than the second wireless network site 130. Of course, some sites or access points can have multiple radios and equipment to communication over two or more different bandwidths and/or and can employ different wireless communication protocols.

In one example, SINR 140 can be the signal quality metric. The threshold in decibel (dB) for SINR can be 10 dB. When the signal quality data is equal to or less than the threshold, 10 dB, the system can direct the UL link for the UE to the 4G site 130. Likewise, when the signal quality data goes above 10 dB, the system can direct the UL link for the UE to the 5G site 120.

The threshold to switch from 5G to 4G can be different than the threshold to switch from 4G to 5G. An additional parameter, hysteresis, can be added, which can be 4 dB. When UL SINR between the UE 100, 105 and the 5G site 120 falls below 10 dB, the system can switch the wireless connection to the 4G site 130. The UL connection can stay on the 4G site 130 until the signal is above 10 dB (SINR)+4 dB (hysteresis)=14 dB. The connection can then switch the UL to the 5G site 120. The same technique can be applied to the DL connection, as well.

If the speed of the vehicle is not taken into account, severe degradation in the connection quality can occur, and can result in a call drop. For example, if a vehicle is moving fast, the vehicle can traverse large distances and go through a significant signal degradation in the period between two measurements of the signal quality data and two decisions whether to switch to a different wireless network site. Once the decision to switch the wireless network sites has been made, the signal quality may have deteriorated beyond repair.

In a more specific example, the vehicle 100 can have a speed of 40 m/s, while the vehicle 105 can have a speed of 60 m/s. The SINR threshold can be 10 dB. The SINR values 180 show the signal quality data associated with the first wireless network site 120. Both vehicles 100 and 105 can have a connection to the first wireless network site 120.

In one second, the vehicle 100 can reach the point 150, while the vehicle 105 can reach the point 160. The SINR at point 150 can be 10 dB, while the SINR at point 160 can be 12 dB. Consequently, after 1 second, the vehicle 100 can switch the connection to the second wireless network site 130, because the SINR value is 10 dB at point 150, while the vehicle 105 can stay connected to the first wireless network site 120 because the SINR value is 12 dB at point 160, which is above the SINR threshold of 10 dB.

After two seconds, the vehicle 100 can reach the point 160, where the signal quality data is 12 dB, above the threshold. The vehicle 100, depending on the hysteresis value can switch back to the first wireless network site 120.

After two seconds, the vehicle 105 can reach the point 170, where the signal quality data associated with the first wireless network site 120 is 0 dB. At that point, the connection is lost, and the call can be dropped. Had the vehicle 105 switched to the second wireless network site 130 earlier, that had a higher SINR value at point 170, the connection could still be valid.

Figure 2A:
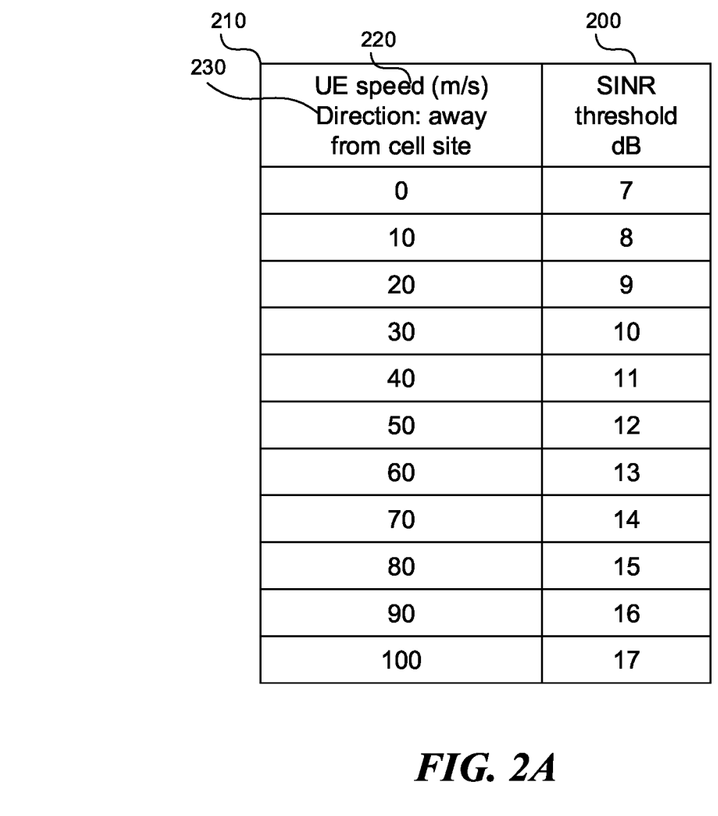
FIGS. 2A-2B show examples of a dynamic signal quality threshold.
Figure 2B:
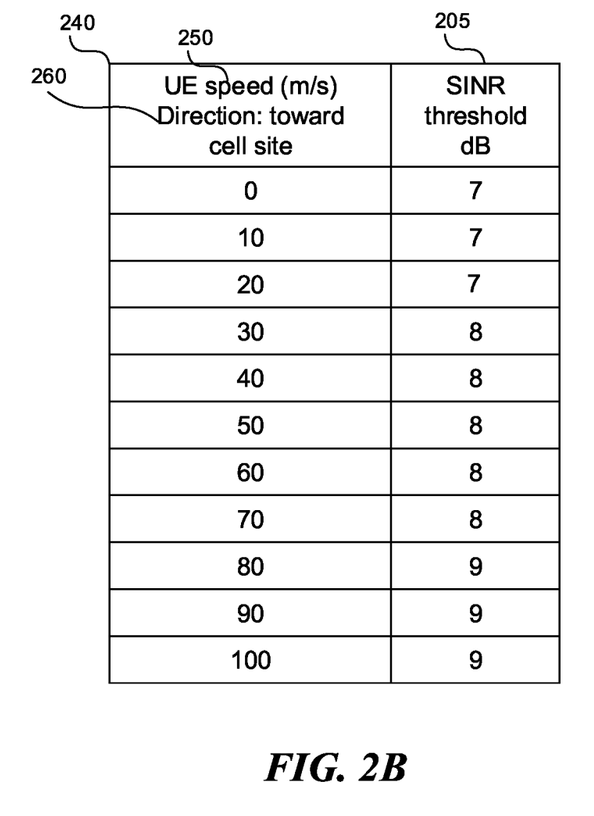

FIGS. 2A-2B show examples of dynamic signal quality threshold. The dynamic signal quality threshold 200, 205 can vary depending on the speed of the vehicle or the direction of the vehicle toward or away from a site or application bandwidth requirement.

For example, the dynamic signal quality threshold 200, 205 can be computed using a function such as:

SINR'=SINR*speed of vehicle*Doppler offset, where SINR' is the dynamic signal quality threshold 200, 205, SINR is the static signal quality threshold, and Doppler offset is a function of the velocity of the vehicle. More specifically, the Doppler offset takes the speed of the vehicle and the direction of the vehicle, whether away or toward the site, into account.

In another example, the dynamic signal quality threshold 200 can be stored as a table 210 in a memory, such as a database. The table 210 can relate the speed 220 of the vehicle, and the direction 230 of the vehicle to the dynamic signal quality threshold 200. In the table 210, the direction 230 of the vehicle is away from the cell site. As can be seen in table 210, the higher the speed 220 of the vehicle, the higher the dynamic signal quality threshold 200.

When the direction of the vehicle is toward the cell site, a different table 240 can relate the speed 250 of the vehicle and the direction 260 of the vehicle to the dynamic signal quality threshold 205. In particular, when the direction is toward the wireless network site, as shown in the table 240, the SINR threshold is lower. The wireless network site associated with the dynamic signal quality threshold 205 can be a wireless network site providing a high bandwidth service, such as a 5G site. The reason for lowering the SINR threshold is that, when the vehicle is moving away from the site, the 5G UL speed can become inconsistent due to lack of signal coverage at a cell edge; thus, switching to a 4G site sooner for consistency can result in a better signal quality. When the vehicle is moving towards the site, the connection speed to the 5G site improves sooner due to sufficient signal coverage; thus, switching from a 4G site to a 5G site sooner can result in a better QoS, because the 5G site can provide higher bandwidth than the 4G site.

To create the table 210, 240, a collector can survey SINR coverage by conducting a "walk test" at an approximate speed of 3 m/s, wirelessly communicating test messages with nearby sites and access points. The collector can be an autonomous device, such as a drone with 4G and 5G radios, running the software configured to perform the SINR measurement. The collector can also be a software configured to perform the SINR measurement and be associated with a personal device such as a mobile phone, health monitor, an AR/MR/VR device, etc.

During the walk test, the collector can collect signal strength, SINR, latency, packet error rate, etc., both in the DL and UL directions, latitude and longitude of the location, and direction of the collector. After gaining the data, the data can be analyzed to generate the tables 210, 240. Data can be analyzed by using a visualization software, test tool software, and/or geodata software that can display a coverage map, a heat map, and/or an x-y plot, etc. The software can overlay different featured values, such as SINR, latency, packet error rate, and/or signal strength on top of the coverage map, the heat map, and/or the x-y plot. Upon inspecting the overlay, a processor can determine the thresholds shown in the tables 210, 240.

The dynamic signal quality threshold 200, 205 can also be affected by the application bandwidth requirement. For example, a 5G millimeter wave site can provide 5-10 times higher bandwidth than a 4G site. Consequently, switching between a 5G site and a 4G site can translate into a sudden decrease in connection speed or a sudden improvement in connection speed.

Application bandwidth requirements can be low for applications such as email, text, or web browsing, and those applications may not be affected by the change in connection speed. Such applications can be purposefully maintained on the wireless network site that offers lower bandwidth, such as the 4G site, and their dynamic signal quality thresholds 200, 205 to switch between a 4G and a 5G site can be increased.

For other applications having a high bandwidth requirement such as coordinated/cooperative driving maneuver, delivery of high definition entertainment, online gaming, high definition sensor sharing, augmented reality (AR), mixed reality (MR), and/or virtual reality (VR), the dynamic signal quality threshold 200, 205 can be adjusted to favor maintaining the connection to the wireless network site offering higher bandwidth, such as the 5G site. As a result, their dynamic signal quality threshold 200, 205 to switch between a 4G and a 5G site can be decreased.

Figure 3:
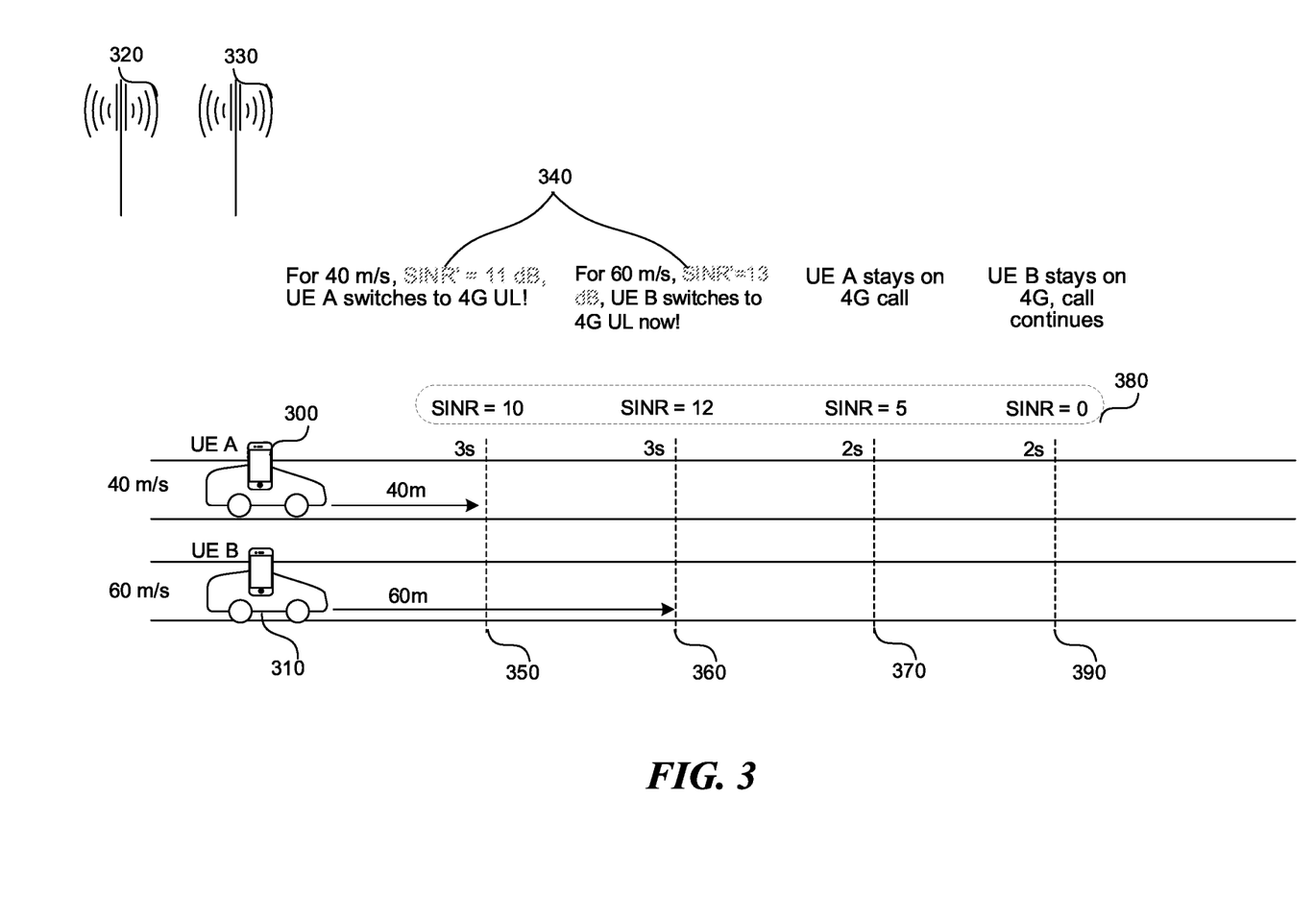
FIG. 3 shows a dynamic signal quality threshold applied to a moving vehicle.

FIG. 3 shows a dynamic signal quality threshold applied to a moving vehicle. For example, the vehicle 300 can have a speed of 40 m/s, while the vehicle 310 can have a speed of 60 m/s. The dynamic signal quality threshold 340 can vary depending on the speed of the vehicle 300, 310 in the direction of the vehicle. The SINR values 380 show the signal quality data associated with the first wireless network site 320.

The vehicle 300, 310 can be moving away from the site 320, 330. In one second, the vehicle 300 can reach the point 350, while the vehicle 310 can reach the point 360. The SINR at point 350 can be 10 dB, while the SINR at point 360 can be 13 dB. As seen in table 210 in FIG. 2A defining the dynamic signal quality threshold 200, the dynamic signal quality threshold, for example SINR, for vehicle 300 moving at 40 m/s is 11 dB, while the dynamic signal quality threshold, for example SINR, for vehicle 310 moving at 60 m/s is 13 dB.

Consequently, after one second, the vehicle 300 can switch the connection to the second wireless network site 330, because the SINR value is 10 dB at point 350, and the dynamic signal quality threshold is 11 dB. The vehicle 310 can also switch the connection to the second wireless network site 330, because the SINR value is 12 dB at point 360, and the dynamic signal quality threshold is 13 dB.

After two seconds, both vehicles 300, 310 stay connected to the second wireless network site 330, because the signal quality keeps degrading at points 370, 390. Unlike in FIG. 1, the vehicle 310 moving at 60 m/s does not drop the call at point 390 because the vehicle 310 is connected to the second wireless network site that still offers a signal at point 390, as opposed to the first wireless network site 320, whose signal drops to 0 dB at point 390.

Figure 4:
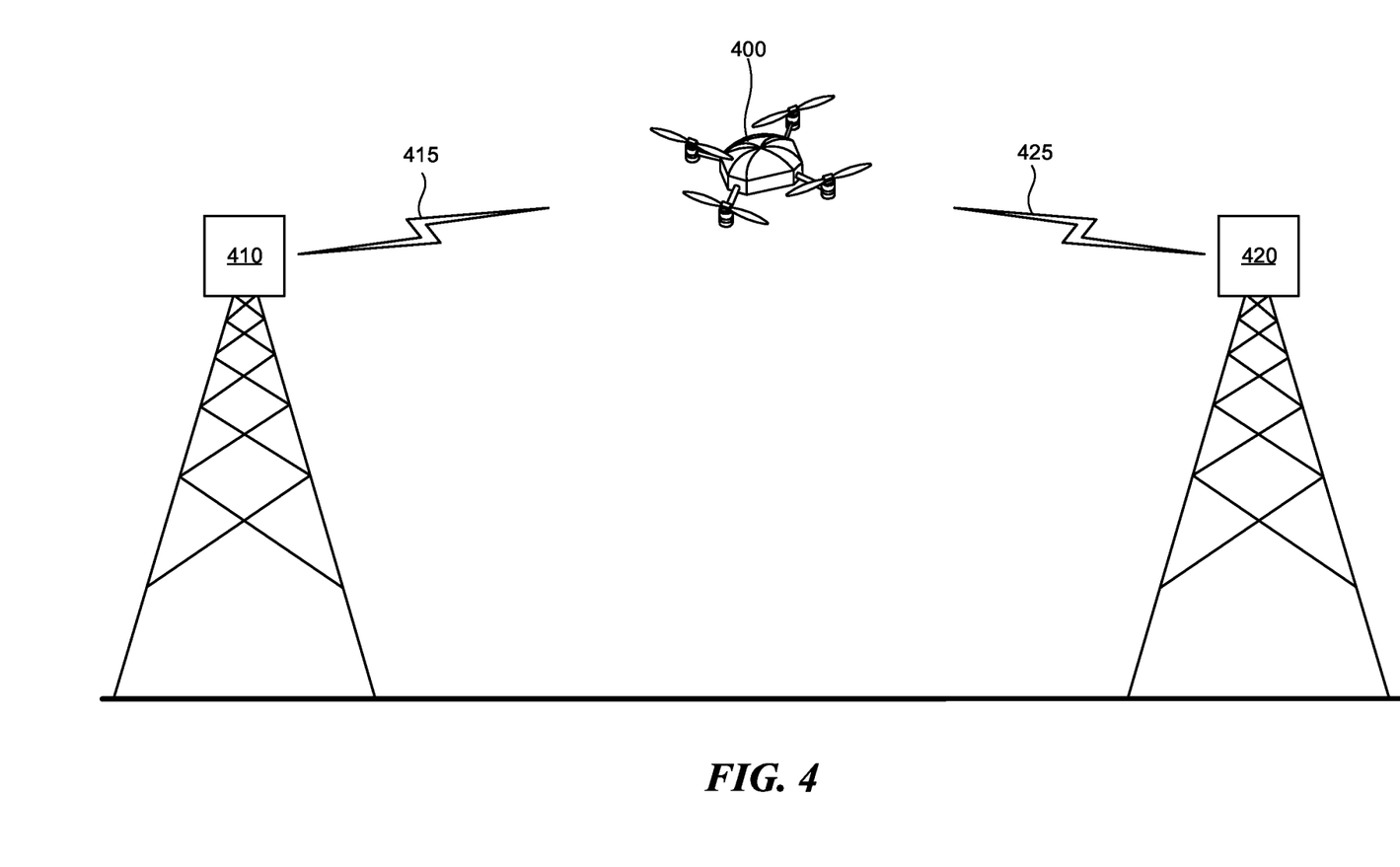
FIG. 4 shows a vehicle in communication with multiple wireless network sites.

FIG. 4 shows a vehicle 400 in communication with multiple wireless network sites 410, 420. The vehicle 400 can be a land vehicle, an aerial vehicle or a water vehicle. The vehicle 400 can be an unmanned vehicle, e.g., an autonomous vehicle, or a manned vehicle. The vehicle 400 can be a drone.

The vehicle 400 can be in communication with multiple wireless network sites 410, 420, such as a Wi-Fi access point, a Wi-Fi router, and/or a cellular network site, such as a 5G site or a 4G site. The decision whether to establish a connection 415 with the wireless network site 410, connection 425 with the wireless network site 420, can be based on the dynamic signal quality threshold, the measured SINR at the location of the vehicle 400, and the velocity of the vehicle, as described in this application.

Figure 5:
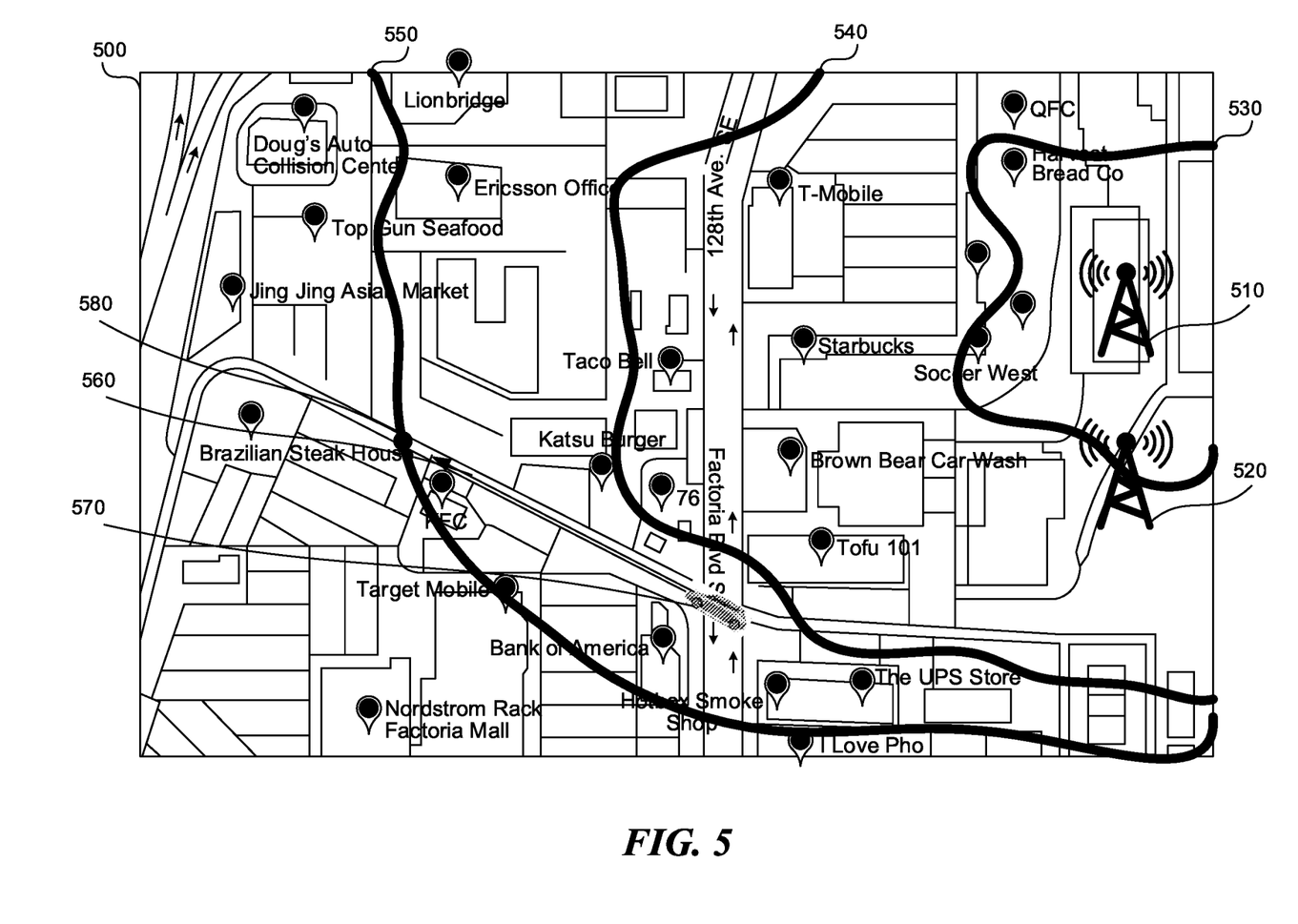
FIG. 5 shows map data for a first wireless network site.

FIG. 5 shows map data 500 for a first wireless network site 510. The first wireless network site 510, such as a 5G site, can provide a signal in an area surrounding the site 510. A hardware or software processor (executing instructions explained below) associated with an autonomous device (such as a drone or a self-driving vehicle, etc.) or a manned device (such as a cell phone, a wearable device, AR/VR goggles, etc.) can obtain map data for the wireless network. The wireless network can be a Wi-Fi network and/or a cellular network. The map data 500 can indicate variations in the signal quality based on geographic location, as shown by the various signal quality data 530, 540, 550. Signal quality data 530, 540, 550 show lines connecting locations where the signal quality is the same. For example, signal quality data 530 can show signal quality SINR of 20 dB, signal quality data 540 can show SINR of 11 dB, while signal quality data 550 can show SINR of 0 dB.

The map data can be used to determine dynamic signal quality thresholds, and generate tables as shown in FIGS. 2A-2B. Also, the map data 500 can be used in real time to switch the connection between the first wireless network site 510, such as a 5G site, and the second wireless network site 520, such as a 4G site.

For example, a hardware or software processor (executing instructions explained below) can obtain the map data and a future path 560 of the vehicle 570, such as the velocity of the vehicle or navigation data associated with the vehicle. Based on the map data and the future path of the vehicle 570, the processor can determine a location 580 where signal quality data associated with the first wireless network site 510 can cause an interruption in a connection between the vehicle and the first wireless network site 510. The processor can switch the connection from the first wireless network site 510 to the second wireless network site 520 at the last opportunity, before the vehicle 570 reaches the location 580.

Figure 6:
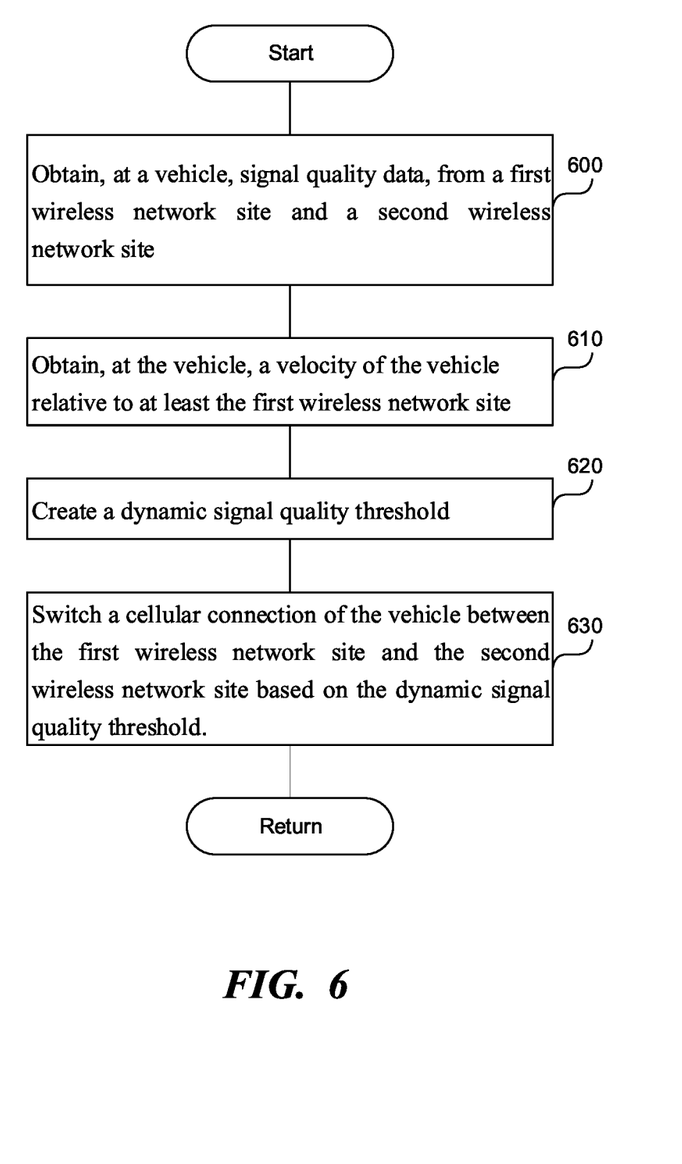
FIG. 6 is a flowchart of a method or processor-implementable instructions to switch a connection of the vehicle between the first wireless network site and the second wireless network site based on the dynamic signal quality threshold.

FIG. 6 is a flowchart of a method or processor-implementable instructions to switch a connection of the vehicle between the first wireless network site and the second wireless network site based on the dynamic signal quality threshold. In step 600, a hardware or software processor (executing instructions explained below) can obtain, at a vehicle, signal quality data, from a first wireless network site and a second wireless network site, where the first and the second wireless network sites provide at least a portion of the signal associated with the signal quality data. The first wireless network site can provide higher bandwidth connection than the second wireless network site. For example, the first wireless network site can be a 5G site, while the second wireless network site can be a 4G site.

In step 610, the processor can obtain, at the vehicle, a velocity of the vehicle relative to at least the first wireless network site, such as a 5G site. In step 620, the processor can create a dynamic signal quality threshold by increasing the dynamic signal quality threshold with an increasing velocity of the vehicle, increasing the dynamic signal quality threshold when the vehicle is moving away from the first wireless network site, and/or decreasing the dynamic signal quality threshold when the vehicle is moving toward the first wireless network site.

For example, as shown in FIG. 2A, the higher the vehicle speed, the higher the dynamic signal quality threshold 200, when the vehicle is moving away from the first wireless network site. When the vehicle is moving toward the first wireless network site, the dynamic signal quality threshold 205 is decreased by comparison to the dynamic signal quality threshold 200; however, the dynamic signal quality threshold 205 increases with increasing speed.

In step 620, the processor can create a dynamic signal quality threshold. To create the dynamic signal quality threshold, the processor can adjust the dynamic signal quality threshold based on the type of the wireless network site to which the vehicle is connected.

For example, the processor can increase the dynamic signal quality threshold when the vehicle is in communication with the wireless network site having lower bandwidth, such as the 4G site. That way, the vehicle can stay in communication with the 4G site longer, until the measured signal quality data matches the higher dynamic signal quality threshold. Increasing the dynamic signal quality threshold when the vehicle is in communication with the wireless network site having lower bandwidth can be desirable when the connection between the vehicle and the wireless network site is not bandwidth intensive, such as when the application associated with the vehicle is an email, a web browser or a voice application. By contrast, when the application associated with the vehicle is a high definition video, an AR, MR, or a VR application, the dynamic quality threshold can be lowered to encourage switching to the higher bandwidth wireless network site, such as the 5G site.

In another example, the processor can decrease the dynamic signal quality threshold when the vehicle is in communication with the 5G site. By decreasing the dynamic signal quality threshold, switching to the lower bandwidth wireless network site, such as the 4G site, can happen sooner, which can be useful when the application associated with the vehicle is not bandwidth intensive, when the vehicle is expected to reach an edge of the 5G cell quickly, etc.

To create the dynamic signal quality threshold, the processor can obtain a table correlating a speed of the vehicle and a direction of motion of the vehicle with one of multiple signal quality thresholds. For example, when the vehicle is moving away from the site, an increasing speed of the vehicle can correlate to an increasing signal quality threshold. In another example, when the vehicle is moving toward the site, an increasing speed of the vehicle can correlate to a monotonically increasing signal quality threshold.

The processor can also determine a function correlating the speed of motion and the one of multiple signal quality thresholds based on the table, by, for example, finding the best fit function to the data represented by the table, such as tables 210, 240 in FIGS. 2A, 2B respectively. For example, the function can be represented as:

$$\text{dynamic signal quality threshold} = \text{static signal quality threshold} * \text{speed of UE} * \text{Doppler offset},$$

where the Doppler offset can depend on the direction of the vehicle, vehicle speed and/or vehicle location. The static and the dynamic signal quality thresholds can include a signal to interference plus noise ratio, a reference signal received power, a bit error rate, or a packet error rate.

In step 630, the processor can switch a cellular connection of the vehicle between the first wireless network site, such as a 5G site, and the second wireless network site such as a 4G site, based on the dynamic signal quality threshold and the measured signal quality data at the location of the vehicle. For example, the processor can switch the cellular connection of the vehicle between the 5G site and the 4G site when the cellular network signal quality data matches and/or is less than the dynamic signal quality threshold.

To avoid severe degradation, or a complete loss of connection, between the vehicle and the first wireless network site, such as the 5G site, the processor can determine whether to switch to the second wireless networking sites more frequently, for example 1000 times more frequently than under normal circumstances. For example, if, under normal circumstances, the processor makes a decision to switch between two sites every second, the processor can make a decision to switch from the first wireless network site to the second wireless network site every millisecond. In another example, if the processor makes the decision whether to switch from the 4G site to the 5G site once a second, the processor can make a decision whether to switch from the 5G site to the 4G site once every millisecond.

Specifically, the processor can obtain, at the vehicle, signal quality data from the wireless network more frequently, such as a thousand times more frequently, when a speed of a vehicle is above a speed threshold. The speed threshold can be 40 m/s. The processor can compare the obtained signal quality data to the dynamic signal quality threshold more frequently when the speed of the vehicle is above the speed threshold. The processor can make the comparison as frequently as obtaining the signal quality data, such as once every millisecond. The processor can switch a cellular connection of the vehicle between the first wireless network site and the second wireless network site based on the comparison.

Computer

Figure 7:
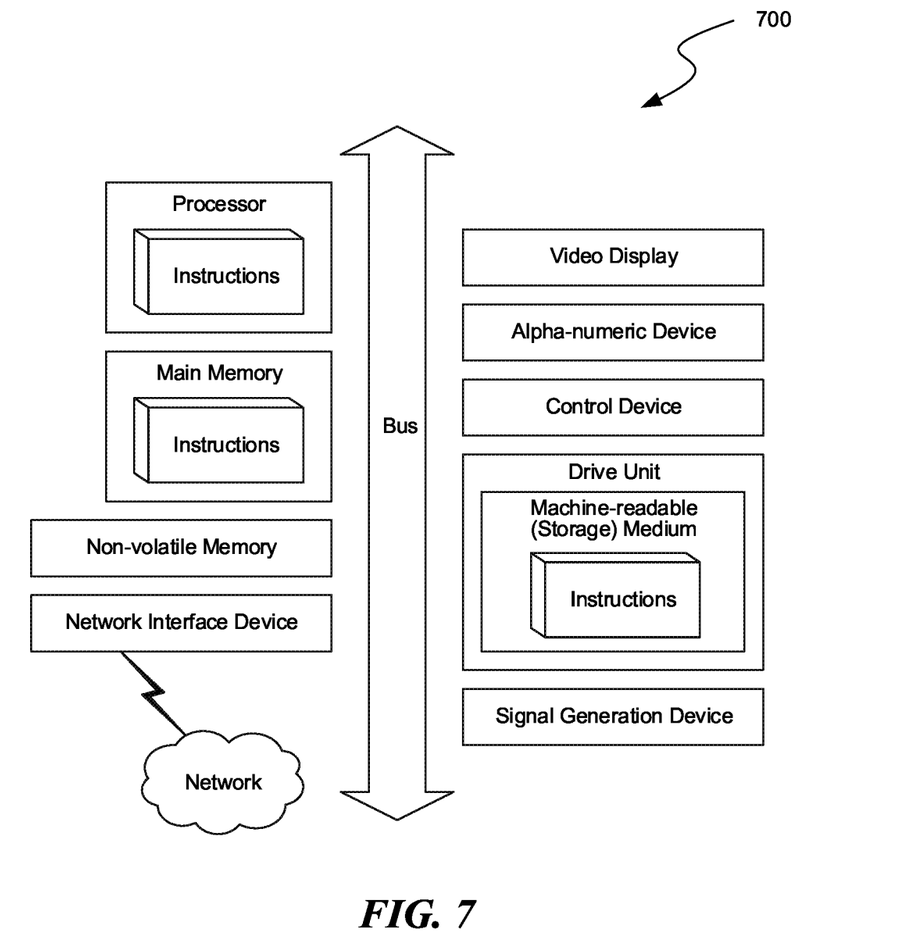
FIG. 7 is a diagrammatic representation of a machine in the example form of a computer system within which a set of instructions, for causing the machine to perform any one or more of the methodologies or modules discussed herein, can be executed.

FIG. 7 is a diagrammatic representation of a machine in the example form of a computer system 700 within which a set of instructions, for causing the machine to perform any one or more of the methodologies or modules discussed herein, can be executed.

In the example of FIG. 7, the computer system 700 includes a processor, memory, non-volatile memory, and an interface device. Various common components (e.g., cache memory) are omitted for illustrative simplicity. The computer system 700 is intended to illustrate a hardware device on which any of the components described in the example of FIGS. 1-6 (and any other components described in this specification) can be implemented. The computer system 700 can be of any applicable known or convenient type. The components of the computer system 700 can be coupled together via a bus or through some other known or convenient device.

The computer system 700 can be associated with the vehicle 100, 105 in FIG. 1, 300, 310 in FIG. 3, 400 and FIG. 4, 570 in FIG. 5, and/or the computer system 700 can be associated with first and second wireless network site 120, 130 in FIG. 1, 320, 330 in FIG. 3, 410, 420 in FIG. 4, 510, 520 in FIG. 5. The processor of the computer system 700 can perform the instructions described in this application. The main memory, the non-volatile memory and/or the drive unit of the computer system 700 can be a non-transient medium that can store the instructions performed by the processor. The network of the computer system 700 can be the wireless network, such as a cellular network, described in this application, over which the vehicle and the wireless network sites communicate.

This disclosure contemplates the computer system 700 taking any suitable physical form. As example and not by way of limitation, computer system 700 can be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 700 can include one or more computer systems 700; be unitary or distributed; span multiple locations; span multiple machines; or reside in a cloud, which can include one or more cloud components in one or more networks. Where appropriate, one or more computer systems 700 can perform without substantial spatial or temporal limitation one or more steps of one or more methods described or illustrated herein. As an example and not by way of limitation, one or more computer systems 700 can perform in real time or in batch mode one or more steps of one or more methods described or illustrated herein. One or more computer systems 700 can perform at different times or at different locations one or more steps of one or more methods described or illustrated herein, where appropriate.

The processor can be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disc, a read-only memory (ROM), such as a CD-ROM, EPROM, or EEPROM, a magnetic or optical card, or another form of storage for large amounts of data. Some of this data is often written, by a direct memory access process, into memory during execution of software in the computer 700. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing an entire large program in memory can not even be possible. Nevertheless, it should be understood that for software to run, if necessary, it is moved to a computer-readable location appropriate for processing, and for illustrative purposes, that location is referred to as the memory in this application. Even when software is moved to the memory for execution, the processor will typically make use of hardware registers to store values associated with the software, and a local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 700. The interface can include an analog modem, ISDN modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 7 reside in the interface.

In operation, the computer system 700 can be controlled by operating system software that includes a file management system, such as a disk operating system. One example of operating system software with associated file management system software is the family of operating systems known as Windows® from Microsoft Corporation of Redmond, Wash., and its associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description can be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems can be used with programs in accordance with the teachings herein, or it can prove convenient to construct more specialized apparatus to perform the methods of some embodiments. The required structure for a variety of these systems will appear from the description below. In addition, the techniques are not described with reference to any particular programming language, and various embodiments can thus be implemented using a variety of programming languages.

In alternative embodiments, the machine operates as a standalone device or can be connected (e.g., networked) to other machines. In a networked deployment, the machine can operate in the capacity of a server or a client machine in a client-server network environment, or as a peer machine in a peer-to-peer (or distributed) network environment.

The machine can be a server computer, a client computer, a personal computer (PC), a tablet PC, a laptop computer, a set-top box (STB), a personal digital assistant (PDA), a cellular telephone, a smartphone, a vehicle-mounted device, a wearable device, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure can be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical discs (e.g., Compact Disk Read-Only Memory (CD-ROMS), Digital Versatile Disks, (DVDs), etc.), among others, and transmission type media such as digital and analog communication links.

In some circumstances, operation of a memory device, such as a change in state from a binary one to a binary zero or vice-versa, for example, can comprise a transformation, such as a physical transformation. With particular types of memory devices, such a physical transformation can comprise a physical transformation of an article to a different state or thing. For example, but without limitation, for some types of memory devices, a change in state can involve an accumulation and storage of charge or a release of stored charge. Likewise, in other memory devices, a change of state can comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device can comprise a transformation, such as a physical transformation. Rather, the foregoing is intended as illustrative examples.

A storage medium typically can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Remarks

The language used in the specification has been principally selected for readability and instructional purposes, and it cannot have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. At least one non-transitory computer-readable medium carrying instructions, which, when executed by at least one data processor of a system, cause the system to implement operations, the operations comprising:

obtain, at a vehicle, signal quality data from a first wireless access point and a second wireless access point,
  wherein the first and second wireless access points provide at least a portion of a signal associated with the signal quality data, and
  wherein the first and the second wireless access points are associated with a wireless telecommunication network;
obtain, at the vehicle, a speed of the vehicle relative to at least one access point;
provide a dynamic signal quality threshold by increasing the dynamic signal quality threshold with an increasing speed of the vehicle, increasing the dynamic signal quality threshold when the vehicle is moving away from the first wireless access point, and decreasing the dynamic signal quality threshold when the vehicle is moving toward the first wireless access point; and
switch a cellular network connection of the vehicle between the first wireless access point and the second wireless access point based on the dynamic signal quality threshold and the signal quality data.

2. The at least one non-transitory computer-readable medium of claim 1, comprising instructions to:
obtain map data for the wireless telecommunication network, wherein the map data indicates variations in the signal quality data based on geographic location and a future path of the vehicle;
determine a location where the signal quality data associated with the second wireless access point causes an interruption in a connection between the vehicle and the second wireless access point based on the map data and the future path of the vehicle; and
switch the connection from the second wireless access point to the first wireless access point before the vehicle reaches the determined location.

3. The at least one non-transitory computer-readable medium of claim 1, wherein providing the dynamic signal quality threshold further comprises increasing the dynamic signal quality threshold when the vehicle is in communication with the first wireless access point and decreasing the dynamic signal quality threshold when the vehicle is in communication with the second wireless access point.

4. The at least one non-transitory computer-readable medium of claim 1, wherein the instructions to provide the dynamic signal quality threshold further comprises instructions to:
obtain a table correlating a speed of the vehicle and a direction of motion of the vehicle with one of multiple signal quality thresholds; and
determine a function correlating the speed and the direction of motion of the vehicle and the one of multiple signal quality thresholds based on the table.

5. The at least one non-transitory computer-readable medium of claim 1, wherein the signal quality data comprises a signal to interference plus noise ratio (SINR), a reference signal received power (RSRP), a bit error rate, or a packet error rate.

6. The at least one non-transitory computer-readable medium of claim 1, wherein the vehicle is an aerial drone, and wherein the first and second access points use a first and a second wireless protocol standards, respectively, and wherein the first and second wireless protocol standards are fourth-generation wireless technology standard (4G) and fifth-generation wireless technology standard (5G), respectively.

7. The at least one non-transitory computer-readable medium of claim 1, wherein switching the network connection of the vehicle comprises:
   switching the network connection of the vehicle between the second wireless access point and the first wireless access point when the signal quality data is below the dynamic signal quality threshold.

8. A system comprising:
   one or more processors; and
   memory coupled to the one or more processors, wherein the memory carries instructions executable by the one or more processors to perform the following operations:
      obtain, at a location associated with a UE, signal quality data from a first wireless access point and a second wireless access point, wherein the first and second wireless access points provide at least a portion of a signal associated with the signal quality data, and wherein the first and the second wireless access points are associated with a wireless telecommunication network;
      obtain, at the location associated with the UE, a speed of the UE relative to at least one access point;
      provide a dynamic signal quality threshold by increasing the dynamic signal quality threshold with an increasing speed of the UE, increasing the dynamic signal quality threshold when the UE is moving away from the first wireless access point, and decreasing the dynamic signal quality threshold when the UE is moving toward the first wireless access point; and
      switch a connection of the UE between the first wireless access point and the second wireless access point based on the dynamic signal quality threshold and the signal quality data.

9. The system of claim 8, the UE comprising a land UE, an aerial UE or a water UE.

10. The system of claim 8, the UE comprising an unmanned UE.

11. The system of claim 8, the wireless telecommunication network comprises a Wi-Fi network, and the first wireless access point and the second wireless access point comprise respective first and second Wi-Fi access points.

12. The system of claim 8, the instructions further comprising operations to:
   obtaining map data for the wireless telecommunication network, wherein the map data indicates variations in the signal quality data based on geographic location and a future path of the UE;
   determining a location where the signal quality data associated with the first wireless access point causes an interruption in a connection between the UE and the first wireless access point based on the map data and the future path of the UE; and
   switching the connection from the first wireless access point to the second wireless access point before the UE reaches the determined location.

13. The system of claim 8, wherein the instructions to provide the dynamic signal quality threshold further comprise instructions to increase the dynamic signal quality threshold when the UE is in communication with the second wireless access point and decrease the dynamic signal quality threshold when the UE is in communication with the first wireless access point.

14. The system of claim 8, wherein the instructions to provide the dynamic signal quality threshold further comprise instructions to operate an autonomous UE configured to wirelessly communicate with the first and second wireless access point and to measure a signal strength associated with the first and second wireless access point.

15. The system of claim 8, wherein the instructions further comprise instructions to:
   obtain, at the UE, the signal quality data from the wireless network more frequently when a speed of the UE is above a speed threshold;
   compare the signal quality data to the dynamic signal quality threshold more frequently when the speed of the UE is above the speed threshold; and
   switch the wireless network connection of the UE between the first wireless access point and the second wireless access point based on the comparison.

16. The system of claim 8, wherein the signal quality data comprises a signal to interference plus noise ratio (SINR), a reference signal received power (RSRP), a bit error rate, or a packet error rate.

17. The system of claim 8, wherein the instructions to switch the wireless connection further comprise instructions to:
   switch the wireless network connection of the UE between the first wireless access point and the second wireless access point when the signal quality data matches the dynamic signal quality threshold.

18. A method comprising:
   obtaining, at a UE, signal quality data from a first wireless access point and a second wireless access point, wherein the first and second wireless access points provide at least a portion of a signal associated with the signal quality data, and wherein the first and the second wireless access points are associated with a wireless telecommunication network;
   obtaining, at the UE, a speed of the UE relative to at least one access point;
   providing a dynamic signal quality threshold by increasing the dynamic signal quality threshold with an increasing speed of the UE, increasing the dynamic signal quality threshold when the UE is moving away from the first wireless access point, and decreasing the dynamic signal quality threshold when the UE is moving toward the first wireless access point; and
   switching a connection of the UE between the first wireless access point and the second wireless access point based on the dynamic signal quality threshold and the signal quality data.

19. The method of claim 18, comprising:
   obtaining map data for the wireless telecommunication network, wherein the map data indicates variations in the signal quality data based on geographic location and a future path of the UE;
   determining a location where the signal quality data associated with the second wireless access point causes an interruption in a connection between the UE and the second wireless access point based on the map data and the future path of the UE; and
   switching the connection from the second wireless access point to the first wireless access point before the UE reaches the determined location.

20. The method of claim 18, wherein providing the dynamic signal quality threshold further comprises:
   obtaining a table correlating a speed of the UE and a direction of motion of the UE with one of multiple signal quality thresholds; and determining a function correlating the speed in the direction of motion of the UE and the one of multiple signal quality thresholds based on the table.

\* \* \* \* \*